(12) United States Patent
Zipperer et al.

(10) Patent No.: US 8,775,827 B2
(45) Date of Patent: Jul. 8, 2014

(54) READ AND WRITE OPTIMIZATION FOR PROTECTED AREA OF MEMORY

(75) Inventors: Joseph P. Zipperer, Seattle, WA (US); Kim Hansen, Renton, WA (US)

(73) Assignee: Media IP, LLC, Seattle, WA (US)

(*) Notice: Subject to any disclaimer, the term of this patent is extended or adjusted under 35 U.S.C. 154(b) by 0 days.

(21) Appl. No.: 13/073,802

(22) Filed: Mar. 28, 2011

(65) Prior Publication Data

US 2012/0254629 A1    Oct. 4, 2012

(51) Int. Cl.
*G06F 11/30* (2006.01)
*G06F 12/14* (2006.01)
*G06F 21/44* (2013.01)

(52) U.S. Cl.
CPC .......... *G06F 12/1408* (2013.01); *G06F 21/445* (2013.01)
USPC ....................................................... 713/193

(58) Field of Classification Search
CPC ..... G06F 12/14; G06F 12/1408; G06F 21/44; G06F 21/445; G06F 21/78; G06F 21/79; G06F 21/60; G11B 20/0021; G11B 20/00217
USPC ....................................................... 713/193
See application file for complete search history.

(56) References Cited

U.S. PATENT DOCUMENTS

| | | | |
|---|---|---|---|
| 6,697,944 B1 | 2/2004 | Jones et al. | |
| 6,859,791 B1 | 2/2005 | Spagna et al. | |
| 7,360,088 B2 * | 4/2008 | Mishina et al. | 713/168 |
| 7,505,584 B2 * | 3/2009 | Kamibayashi et al. | 380/22 |
| 7,779,064 B2 | 8/2010 | Phillips | |
| 7,809,888 B1 | 10/2010 | Clark et al. | |
| 7,844,831 B2 * | 11/2010 | Benhammou et al. | 713/189 |
| RE42,019 E | 12/2010 | Tagawa et al. | |
| 8,306,918 B2 | 11/2012 | Farrugia et al. | |
| 8,312,294 B2 * | 11/2012 | Sato et al. | 713/193 |
| 2002/0126841 A1 * | 9/2002 | Arai | 380/46 |
| 2003/0220835 A1 | 11/2003 | Barnes, Jr. | |
| 2004/0006690 A1 * | 1/2004 | Du et al. | 713/2 |
| 2004/0010601 A1 | 1/2004 | Afergan et al. | |
| 2004/0254940 A1 | 12/2004 | Brush | |
| 2005/0025465 A1 | 2/2005 | Danieli | |
| 2005/0044280 A1 | 2/2005 | Reisman | |
| 2005/0190782 A1 | 9/2005 | Buckley et al. | |
| 2006/0156355 A1 | 7/2006 | Kawasaki et al. | |

(Continued)

OTHER PUBLICATIONS

Young; International Search Report for PCT/US07/22007; mailed May 5, 2008; 1 page.

(Continued)

*Primary Examiner* — Cordelia Zecher
*Assistant Examiner* — Vadim Savenkov
(74) *Attorney, Agent, or Firm* — Lowe Graham Jones PLLC

(57) ABSTRACT

A system (and method) to update content of a secure area of a secure digital (SD) card is disclosed. The system performs a first authenticated key exchange to access the secure area of the secure digital memory. The system reads content from the secure area in response to successful performance of the first authenticated key exchange. The system modifies the content in a memory of a computer system. The system performs a second authenticated key exchange to access the secure area of the secure digital card in preparation to write to the secure area of the secure digital memory. The system then writes modified content to the secure area of the secure digital memory in response to successful performance of the second authenticated key exchange.

9 Claims, 3 Drawing Sheets

(56) References Cited

U.S. PATENT DOCUMENTS

| | | |
|---|---|---|
| 2006/0200415 A1 | 9/2006 | Lu |
| 2006/0224519 A1 | 10/2006 | Ahn |
| 2006/0239650 A1 | 10/2006 | Heredia et al. |
| 2007/0033344 A1 | 2/2007 | Tanaka |
| 2007/0192634 A1 | 8/2007 | Cheon et al. |
| 2007/0219921 A1 | 9/2007 | Lee et al. |
| 2007/0234341 A1 | 10/2007 | Chang et al. |
| 2008/0075437 A1 | 3/2008 | Hamada et al. |
| 2008/0098239 A1* | 4/2008 | Wada et al. ............ 713/193 |
| 2008/0133546 A1 | 6/2008 | Phillips |
| 2008/0176540 A1 | 7/2008 | Khedouri et al. |
| 2008/0205291 A1 | 8/2008 | Li et al. |
| 2008/0228300 A1 | 9/2008 | Tagawa et al. |
| 2008/0270796 A1* | 10/2008 | Suu et al. ............ 713/169 |
| 2008/0271154 A1* | 10/2008 | Kamada et al. ............ 726/26 |
| 2009/0086978 A1 | 4/2009 | McAvoy et al. |
| 2009/0150487 A1 | 6/2009 | Wolfish et al. |
| 2009/0164709 A1* | 6/2009 | Lee et al. ............ 711/103 |
| 2009/0282454 A1 | 11/2009 | Ekstrand |
| 2009/0313432 A1 | 12/2009 | Spence et al. |
| 2010/0023689 A1 | 1/2010 | Kim |
| 2010/0127013 A1 | 5/2010 | Butler |
| 2010/0262912 A1 | 10/2010 | Cha |
| 2010/0280953 A1 | 11/2010 | Kitazato |
| 2010/0287609 A1 | 11/2010 | Gonzalez et al. |
| 2010/0293581 A1 | 11/2010 | Robert |
| 2010/0297933 A1 | 11/2010 | Sim |
| 2011/0009051 A1 | 1/2011 | Khedouri et al. |
| 2011/0078722 A1 | 3/2011 | Wendling |
| 2011/0091187 A1 | 4/2011 | Duffin et al. |
| 2011/0093622 A1 | 4/2011 | Hahn et al. |
| 2011/0197131 A1 | 8/2011 | Duffin et al. |
| 2011/0225417 A1 | 9/2011 | Maharajh et al. |
| 2011/0289137 A1 | 11/2011 | Ittah et al. |
| 2012/0072713 A1 | 3/2012 | Begum et al. |
| 2012/0124390 A1 | 5/2012 | Zipperer et al. |
| 2012/0137135 A1 | 5/2012 | Kasahara et al. |
| 2012/0233447 A1 | 9/2012 | Fitzgerald |
| 2012/0272065 A1 | 10/2012 | Matsukawa et al. |
| 2012/0315019 A1 | 12/2012 | Zipperer et al. |
| 2012/0324244 A1 | 12/2012 | Zipperer et al. |

OTHER PUBLICATIONS

Android SDK, available for download at http://www.netmite.com/android/mydroid/1.6/out/target/common/docs/offline-sdk/guide/developing/tools/othertools.html#mksdcard, downloaded Jun. 16, 2013.

Guofei, et al. "PLI: A New Framework to Protect Digital Content for P2P Networks," Year 2003; Microsoft Research Asia, Beijing 100080, China; pp. 1-12.

* cited by examiner

READ AND WRITE OPTIMIZATION FOR PROTECTED AREA OF MEMORY

BACKGROUND

1. Field of Art

The disclosure generally relates to the field of memory devices, and more particularly, optimization for protected areas of solid state memory devices.

2. Description of the Related Art

Today, Secure Digital (SD) cards are in wide use for many storage applications including audio (MP3 players), pictures (digital cameras), and full motion video (camcorders and HD camcorders). The SD card provides an acceptable portable storage medium to transfer unprotected content between different devices, especially for the video capture devices mentioned above. The content stored on SD cards can be transferred or archived to devices with larger storage capacities and additional processing capabilities. One such additional processing capability allows consumers to create and manage a digital archive of consumer generated content.

Consumers are familiar with the storage capabilities, but there are a very few applications which take advantage of the security (the S in Secure Digital) features of the SD card. Today's applications that use the security features enable digital rights management (DRM) to protect the content from copying or other forms of piracy and theft. Examples of DRM applications include still images and full-motion video (1-seg and GreenPlay by MOD Systems Incorporated). DRM protected content on the aforementioned SD cards cannot be archived easily. The DRM protection must remain intact during generation, transfer, and archival, often tied directly to the physical SD media on which it was originally stored.

The DRM specification and processing require access to both the secure and user areas of an SD card. Specific linkages between the files on the secure area and the files on the user area are determined by the DRM specification. For SD cards, there are multiple DRM specifications currently in existence for different applications. Three of particular DRM types are SD-bind, SD-Video, and SDSD-Video.

When accessing the secure area, a mutual authentication (e.g., authenticated key exchange (AKE)) process is necessary prior to accessing the secure area. This process can take 10 ms or more for each secure access and is highly dependent on the physical implementation of the SD cards themselves. There are three types of secure accesses available: read, write, and erase. Each time a mutual authentication is completed, a single secure access can be accomplished. If an operation requires more than one access (for examples, reading a directory entry or reading different files) or more than one type of access (erase, read, write), a mutual authentication is required for each access. The 10+ milliseconds ("ms") time is therefore additive, if not multiplicative, and reduces the rate at which the SD cards can be programmed.

This problem is exemplified by applications using SD card security. For example, several companies are preloading movie content on microSD cards to playback in CE devices. Preloading means that content is loaded on to the SD card prior to packaging. Other companies are loading content on-demand in a retail environment, a form of manufacturing on demand. Both processes are subject to speed degradation associated with the mutual authentication process.

Typical process overhead for preloading consists of 25 AKE operations for SD-Bind. More AKE operations are required for manufacturing on demand if the SD card is not in an "initial" state containing only the file systems. More operations are needed for SD-Video and SDSD-Video as the number of AKE operations is also dependent on the content to be protected. AKE for SDSD-Video is approximately 100 operations. Moving content from one SD device to another can range from 70 to almost 150 operations. Using a 10 ms average time for a single AKE operation, this process can add 250 ms to the manufacturing cycle time for secure operations alone. Using an SD card with a 10 MB/s throughput (a class 10 SD card) and a content size of 500 MB, content write time is approximately 50 second ("s") for content plus 250 ms for secure operations leaving the total time to write the content at 50.25 s.

BRIEF DESCRIPTION OF DRAWINGS

The disclosed embodiments have other advantages and features that will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Figure 1:
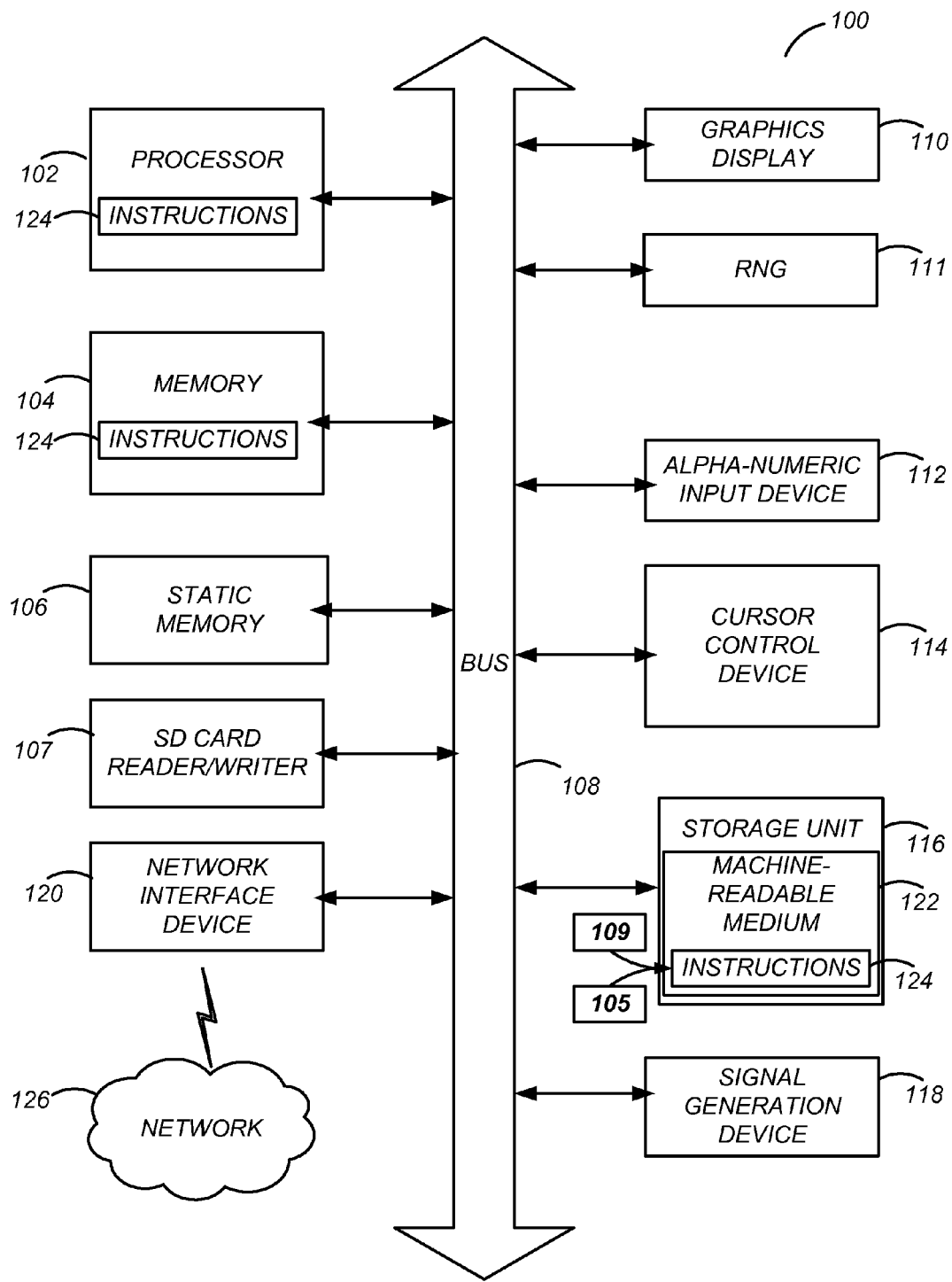
FIG. 1 illustrates one example embodiment of components of an example machine able to read instructions from a machine-readable medium and execute them in a processor (or controller).
Figure 2A:
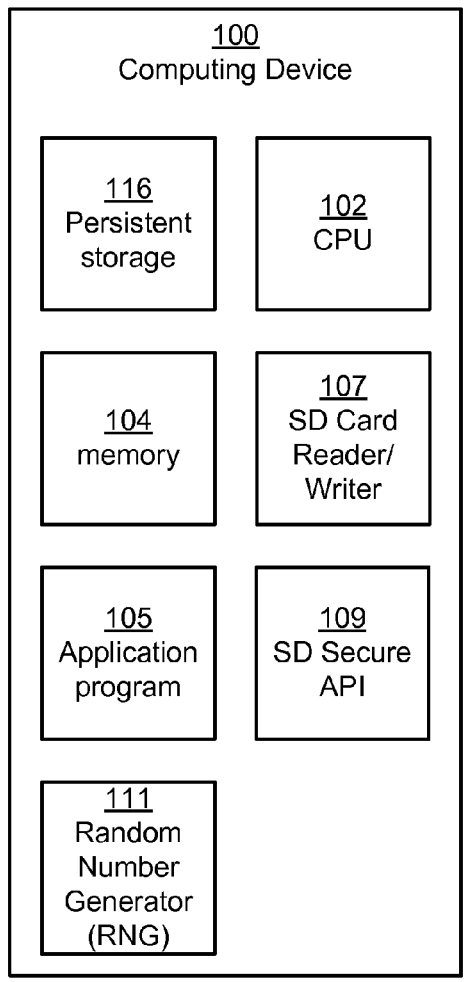
FIG. 2A-FIG. 2E illustrate one example embodiment of a computing configuration for use with a digital right management (DRM) environment.
Figure 2C:
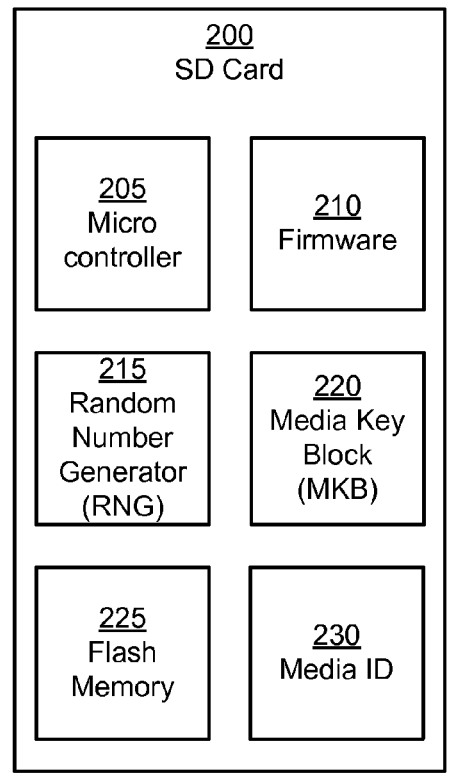
Figure 2B:
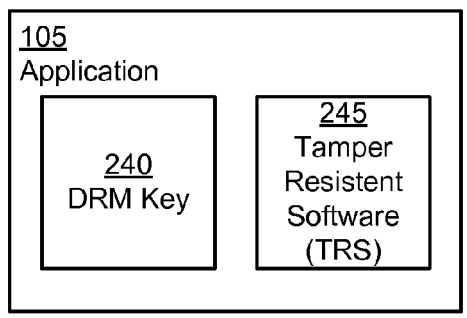
Figure 2D:
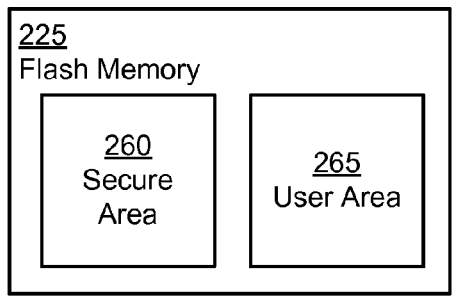
Figure 2E:
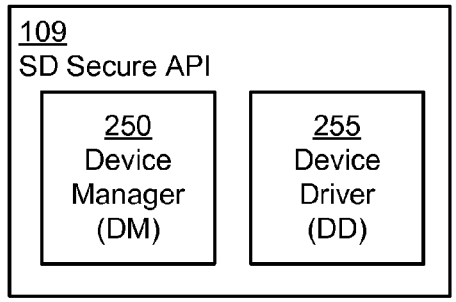

A system (and method) to update content of a secure area of a secure digital (SD) card is disclosed. The system performs a first authenticated key exchange to access the secure area of the secure digital memory. The system reads content from the secure area in response to successful performance of the first authenticated key exchange. The system modifies the content in a memory of a computer system. The system performs a second authenticated key exchange to access the secure area of the secure digital card in preparation to write to the secure area of the secure digital memory. The system then transfers the content to the secure area of the secure digital memory in response to successful performance of the second authenticated key exchange Computing Machine Architecture FIG. 1 is a block diagram illustrating components of an example machine able to read instructions from a machine-readable medium and execute them in a processor (or microcontroller). Specifically, FIG. 1 shows a diagrammatic representation of a machine in the example form of a computer system 100 within which instructions 124 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, a gaming console, a Blu-ray Disc player, or any machine capable of executing instructions 124 (sequential or otherwise) that specify actions to be taken by that machine. In addition, the machine may be configured to include instructions stored as firmware or a hardware state machine (microcode). Further, while only a single machine is illustrated, the term "machine" shall also be taken to include any collection of machines that individually or jointly execute instructions 124 to perform any one or more of the methodologies discussed herein.

The example computer system 100 includes a processor 102 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 104, and a static memory 106, which are configured to communicate with each other via a bus 108. The computer system 100 may further include graphics display unit 110 (e.g., a plasma display panel (PDP), a liquid crystal display (LCD), a projector, or a cathode ray tube (CRT)). The computer system 100 may also include alphanumeric input device 112 (e.g., a keyboard), a cursor control device 114 (e.g., a mouse, a trackball, a joystick, a motion sensor, touchscreen, remote control or other pointing instrument), a persistent storage unit 116, a signal generation device 118 (e.g., a speaker), and a network interface device 120, which also are configured to communicate via the bus 108. The computer system 100 also may include a random number generator (RNG) 111. The random number generator 111 can be implemented in either hardware or software.

The storage unit 116 includes a machine-readable medium 122 on which is stored instructions 124 (e.g., software) embodying any one or more of the methodologies or functions described herein. The instructions 124 (e.g., software) may also reside, completely or at least partially, within the main memory 104 or within the processor 102 (e.g., within a processor's cache memory) during execution thereof by the computer system 100, the main memory 104 and the processor 102 also constituting machine-readable media. The instructions 124 (e.g., software) may be transmitted or received over a network 126 via the network interface device 120.

Also included in the computing system 100 is a secure digital (SD) card reader/writer 107. The SD card reader/writer in one embodiment may be a physical device that accepts SD card in various physical formats (SD card, mini SD, or micro SD) and interfaces the electrical characteristics such that the storage on the SD card can be accessed by the computing device. The card reader may be internal to the computing device or external using adapters such as a USB-SD card reader, PC card-card reader, express card reader, or other means such that the computing device can communicate with an SD card.

While machine-readable medium 122 is shown in an example embodiment to be a single medium, the term "machine-readable medium" should be taken to include a single medium or multiple media (e.g., a centralized or distributed database, or associated caches and servers) able to store instructions (e.g., instructions 124). The term "machine-readable medium"shall also be taken to include any medium that is capable of storing instructions (e.g., instructions 124) for execution by the machine and that cause the machine to perform any one or more of the methodologies disclosed herein. The term "machine-readable medium" includes, but not be limited to, data repositories in the form of solid-state memories, collections of logic elements, optical media, and magnetic media.

In one example embodiment, the instructions 124 correspond to an application program 105. The application program 105 includes a set machine readable instructions to carry out key exchange and data transfer specifications as further described herein. In one example, the application program 105 may work with a digital rights management (DRM) key 240 and tamper resistant software 245.

In addition, the example computer system 100 includes a SD secure application programming interface (API) 109. The SD API is a software component that facilitates access to the SD card's secure area. The software architecture of the computer systems assumes that the SD card is capable of responding to the commands from the application program using the SD Secure API architecture.

Digital Rights Management Computing Environment

FIG. 2A-FIG. 2E illustrate one example embodiment of a computing configuration for use with a digital right management (DRM) environment. The DRM environment includes the computer system 100 and a Secure Digital (SD) card 200. The SD card 200 includes a microcontroller 205, a firmware 210, a random number generator (RNG) 215, a media key block (MKB) 220, a flash memory 225, and a media identifier (MID) 230.

The application program 105 and the SD secure API 109 of the computer system 100 are further broken out for illustrative purposes to show additional components. Specifically, the application program 105 includes a DRM key 240 and a tamper resistant software (TRS) 245. The DRM key may also be external to the application program so long as the key can be securely stored. The SD secure API 109 includes a device manager (DM) 250 and a device driver (DD) 255. Similarly, the flash memory 225 is further broken out for illustration purposes to show a secure (or protected) area 260 and a user area 265.

Turning now to the application program 105, the DRM key 240 is stored in the computer system 100 and used to complete a key exchange with the SD card 200. Specifically, the key exchange is used to gain access to the SD card secure area 260 in accordance with the Content Protection for Recordable Media (CPRM) specification for use with SD cards. The application is provisioned with the DRM key either at initial installation or contained within the program itself. The random number generator 111 in the computer system 100 provides random numbers as required by the Authenticated Key Exchange (AKE) specification.

The key exchange process and subsequent data access is subject to hackers (unauthorized or rogue applications) attempting to obtain the data stored on the secure area 260 of the SD card 200 that is transferred into the application program 105. The tamper resistant software 245 protects against these and other hacking attempts (attacks). The tamper resistant software 245 comprises software code that may include techniques which remain proprietary to their respective vendors but may include such items as code obfuscation, anti-debugging, and code duplication.

Next, referring to the SD secure API 109, it comprises a software component that facilitates access to the secure area 260 on the SD card 200. The software architecture of the computer system 100 assumes that the SD card is capable of responding to the commands from the application program 105 using the SD secure API 109 architecture.

As noted previously, the SD secure API 109 includes the device manager (DM) 250 and the device driver (DD) 255. The device manager (DM) 250 identifies SD card readers attached to the computer system 100. Once card readers are identified, the device manager 250 matches the corresponding device driver 255 with the specific physical card reader, or readers, attached to the computer system 100. The device driver 255 provides a device independent API interface to card readers allowing individual device drivers to be hardware specific. It formats secure commands specifically for card readers and returns data to the application program 105. The device driver 255 provides a conduit for application to communicate with card readers, which in turn communicate directly with the secure area 260 of the SD card 200.

Turning now to the SD card 200, the SD card may be a multiple of physical package configurations such as SD card, mini SD, or micro SD. The SD card 200 must conform to the specifications developed and enforced by the SD CARD ASSOCIATION. The general construct of the SD card 200 is illustrated to provide a general idea of how an SD card may be internally constructed. The decomposition is not intended to reveal any specific trade secrets or patents of the many SD card vendors. The SD card itself can be thought of as an application specific computing platform, as opposed to the general purpose computing platform of a computing device. The specific application is to transfer data to/from the computer system 100, and if required, to securely store data by restricting access to applications that can complete the Authenticated Key Exchange (AKE) in order to access the secure data.

In the SD card 200, a microcontroller device 205 is configured to receive requests for data from a card reader. In the case of user area 265 access (insecure access) data is returned without completing the Authenticated Key Exchange process. The firmware 210 comprises software machine instructions by the microcontroller 205 to interpret card reader commands and return data to the card reader. The firmware includes the necessary algorithms (cryptograph and hash) in accordance with SD CARD ASSOCIATION and CPRM specifications to implement the Authenticated Key Exchange (AKE) protocol. Firmware may be implemented using physical logic elements or can be a program that is interpreted by a microcontroller 205.

The random number generator 215 that provides random numbers for replay protection required by AKE protocol. The random number generator 215 can be implemented in either hardware or software. It is noted that the random number generator 111 in the computer system 100 and the random number generator 215 in the SD card 200 are both used for the AKE protocol. The media key block (MKB) 220 is structured in accordance with the CPRM specification for SD Cards. Specifically, multiple keys are included in SD cards and are provisioned by the SD card manufacturer at manufacturing time. The media key block 220 includes DRM keys that may change due to key revocations. Specific keys are used with the authenticated key exchange protocol that must be completed prior to accessing the secure flash (or other non-volatile memory) area.

As noted previously, the SD card contains flash memory 225 that is partitioned into two separate regions. One is a secure area 260 and the other is a user (unsecured) area 265. The secured area 260 may be implemented as a physical device or logical region within the SD card as chosen by the SD card original equipment manufacturer (OEM). The size of the secure area 260 size is determined at manufacturing time according to the SD card specifications. Requests to access the data from the secured area 260 must first complete the AKE process. The user (or unsecured) area 265 may be implemented in the same manner as the secure area 260. The user (or unsecured) area 265 also may be either physical or logical partitions depending on implementation within the SD card. Request for data from the user area 265 does not require AKE process to complete.

The flash memory 225 is configured to store secure data in the secure area 260 and unsecured data in the user area 265. Both the secure data and the unsecure data are stored in a persistent manner so that it can be retrieved at a later time. It is noted that every SD card is provisioned with a secure area 260, even if it is never used by any application.

The Media ID 230 is used in accordance with the AKE protocol. The DRM key of the media key block (MKB) 220 and media ID 230 are required for the AKE processes. These items are provisioned by the SD card manufacturer during the manufacturing process.

When executing, the application program 105 uses a DRM key, the random number generator 111 of the computer system 100, the media key block 220, and the media ID 230 when transferring data through the device manager 250 and device driver 255 in order to complete the security exchange with the SD card 200. The SD card 200 uses the media key block 220, the random number generator 215, the media ID 230, and data sent by the application program 105 to calculate the AKE process result. The exchange process includes mutual authentication whereby both the SD card 200 and application program 105 authenticate each other before accessing the secure area 260 of the SD card 200. The process completes when both the SD card 200 has authenticated the application program 105 and the application program 105 has authenticated the SD card 200. Here, the SD card 200 performs the same operations as the application program 105 and if both achieve the same AKE process result, mutual authentication is achieved and both the application program 105 and SD card 200 can proceed to access the data in the secure area 260 within the flash memory 225 of the SD card 200.

Optimized Write to Secure Digital Card Secure Area

In one aspect of the disclosed configuration, the number of AKE operations can be reduced to two operations. Referring to the example from above, the resultant time is then 50.02seconds ("s") or an overall reduction of 230 milliseconds ("ms") per SD card. When considering SDSD, 60 or more AKE operations can be required in a manufacturing setting. By way of example this removes 580 ms from the manufacturing procedure, or approximately a 2% reduction in overall time. For manufacture on demand set ups, for example retail kiosk applications that manufacture a custom configured SD card, the savings are greater as more information is stored on the protected area. This information gets stored when either the information is written to the protected area during manufacturing or the information is written to the protected area prior to manufacturing.

In secure operation configurations the time change savings are significant. For example, when considering just the secure operations, the total time for AKE exchanges plus data transfers using a 32 KB transfer, the time required is 10 ms+3 ms=13 ms. For a 60 operations, the total time is 780 ms. When the AKEs are reduced to 2, the total time required is 200 ms. The process is almost four times (4×) faster than a conventional secure write process.

Figure 3:
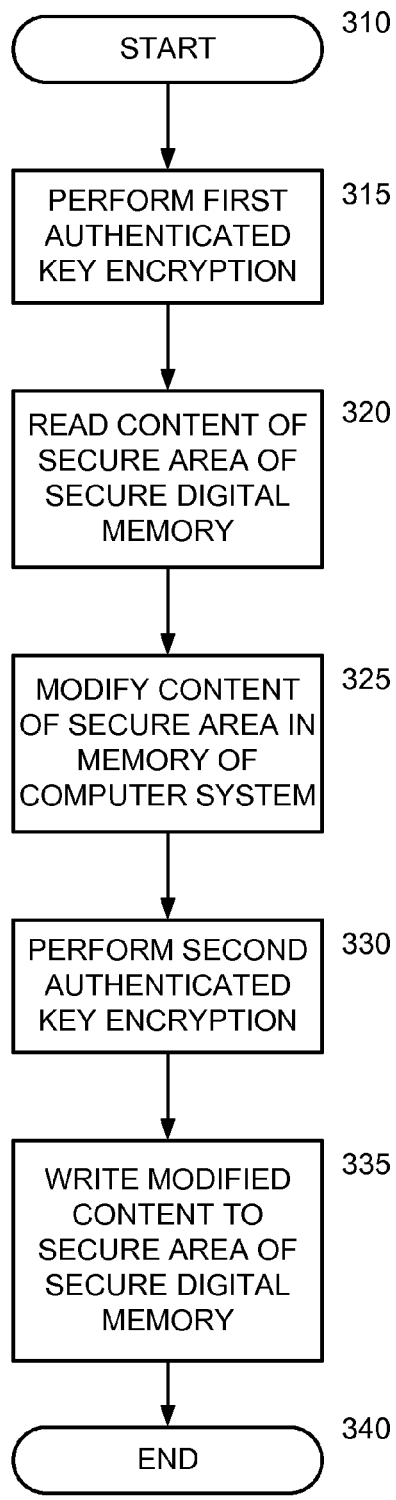
FIG. 3 illustrates one example embodiment of a process for optimizing writes to secure digital (SD) card.

FIG. 3 illustrates one embodiment for achieving time savings as per the examples illustrated previously. The process starts 310 and performs 315 a first AKE and reads 320 content of the secure area of SD memory into a memory, e.g., memory 104, of the computer system 100. The modified process includes an initial AKE exchange plus a read of all necessary data blocks. In particular, the process reads 320 the file and file system data into the memory 104 of the computer system 100 for processing by the application. This data includes the data from the secure (or protected area) 260 and the user area 265 of the SD card 200. The process modifies the content from the secure area 260 in the memory, e.g., memory 104, of the computer system 100. The process performs all necessary file and file system modifications before communicating to the SD card 200. When the application next communicates with the SD card, the process performs 330 a second AKE. The process writes 335 all necessary data back to the SD card 200, specifically, the secure area 260 and the user area 265 of the SD card 200. The process now can end 340. The process beneficially eliminates unnecessary AKE and results in time savings, for example, as described previously. This process can also be modified to use any number of AKEs with the minimum of 2 as required by security, integrity, or other policies associated with the applications.

It is also noted that some applications require only read operations from the SD card secure area. This optimization process is equally applicable to read-only applications using multiple read operations from the secure area. Since multiple read operations required multiple AKE, the read operations can also be reduced to a single read and single AKE by following the process steps from 310 through 320, eliminating the write operations described in 325 through 340

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example processes described herein, e.g., as described with FIGS. 2A-2E and 3, may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "'characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has,""having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for optimization of writes to a secure digital card (SD card) secured (or protected) area through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method in an authorized computer application program for optimizing access of content stored in a secure area of a secure digital (SD) memory, without performing a separate authenticated key exchange for each access to the secure area, the method comprising:
    performing a first authenticated key exchange to access the secure area of the secure digital memory;
    in response to successful performance of the first authenticated key exchange, performing a plurality of read operations of secure content from the secure area of the secure digital memory into a main memory of a computer system for access by the authorized computer application program, without performing additional authenticated key exchange operations for each of the performed plurality of read operations;
    also in response to successful performance of the first authenticated key exchange, performing a plurality of read operations of user content from a user area of the secure digital memory;
    modifying, while the secure content is in the main memory, the secure content previously read into the main memory of the computer system from the secure area of the secure digital memory;
    performing a second authenticated key exchange to access the secure area of the secure digital card in preparation to write to the secure area of the secure digital memory;
    in response to successful performance of the second authenticated key exchange, performing a plurality of write operations to write the modified secure content back to the secure area of the secure digital memory without performing additional authenticated key exchange operations for each of the performed plurality of write operations; and
    also in response to successful performance of the second authenticated key exchange, performing a plurality of write operations of user content to the user area of the secure digital memory.

2. The method of claim 1, wherein the secure digital memory is in a secure digital card configuration.

3. The method of claim 1, wherein the step of performing a plurality of write operations to write the modified secure content back to the secure area of the secure digital memory is suppressed for read-only processing.

4. A non-transitory computer readable storage medium comprising instructions that, when executed, cause at least one processor to:
    perform a first authenticated key exchange to access a secure area of a secure digital memory;
    in response to successful performance of the first authenticated key exchange, perform a plurality of read operations to read secure content from the secure area of the secure digital memory into a main memory of a computer system, without performing additional authenticated key exchange operations for each of the performed plurality of read operations;
    also in response to successful performance of the first authenticated key exchange, performing a plurality of write operations of user content from a user area of the secure digital memory;
    modify, while the secure content is in the main memory, the secure content previously read into the main memory of the computer system from the secure area of the secure digital memory;
    perform a second authenticated key exchange to access the secure area of the secure digital card in preparation to write to the secure area of the secure digital memory;
    in response to successful performance of the second authenticated key exchange, perform a plurality of write operations write the modified secure content back to the secure area of the secure digital memory, without performing additional authenticated key exchange operations for each of the performed plurality of write operations; and
    also in response to successful performance of the second authenticated key exchange, performing a plurality of write operations of user content from a user area of the secure digital memory;

5. The computer readable storage medium of claim 4, wherein the secure digital memory is in a secure digital card configuration.

6. The computer readable storage medium of claim 4, wherein instructions to perform a plurality of write operations to write the modified secure content back to the secure area further comprise instructions to suppress the write operations for read-only processing.

7. A computing system configured to optimize access of content stored in a secure area of a secure digital (SD) memory, without performing a separate authenticated key exchange for each access to the secure area, the system comprising:
a memory; and
a processor, the processor configured to:
perform a first authenticated key exchange to access the secure area of the secure digital memory;
in response to successful performance of the first authenticated key exchange, perform a plurality of read operations to read secure content from the secure area of the secure digital memory into the memory of a computer system, without performing additional authenticated key exchange operations for each of the performed plurality of read operations;
also in response to successful performance of the first authenticated key exchange, performing a plurality of read operations of user content from a user area of the secure digital memory;
modify, while the secure content is in the memory, the secure content previously read into the memory;
perform a second authenticated key exchange to access the secure area of the secure digital card in preparation to write to the secure area of the secure digital memory;
in response to successful performance of the second authenticated key exchange, perform a plurality of write operations to write the modified secure content from the memory back to the secure area of the secure digital memory without performing additional authenticated key exchange operations for each of the performed plurality of write operations; and
also in response to successful performance of the second authenticated key exchange, perform a plurality of write operations of user content to the user area of the secure digital memory.

8. The computing system of claim 7, further comprising a secure digital card input configured to receive a secure digital card and wherein the secure digital memory is a secure digital card.

9. The computing system of claim 7, wherein the processor is further configured to suppress the performing of the write operations to write of the modified secure content from the memory back to the secure area for read-only processing.

* * * * *

UNITED STATES PATENT AND TRADEMARK OFFICE
CERTIFICATE OF CORRECTION

PATENT NO. : 8,775,827 B2  
APPLICATION NO. : 13/073802  
DATED : July 8, 2014  
INVENTOR(S) : Joseph P. Zipperer et al.

Page 1 of 1

It is certified that error appears in the above-identified patent and that said Letters Patent is hereby corrected as shown below:

In the claims:

In column 10, line 47, in claim 4, "performing" should be --perform--.

In column 10, line 48, in claim 4, "write" should be --read--.

In column 10, line 59, in claim 4, --to-- should be inserted between "operations" and "write".

In column 10, line 65, in claim 4, "performing" should be --perform--.

In column 11, line 26, in claim 7, "performing" should be --perform--.

Signed and Sealed this  
Sixteenth Day of August, 2016

Michelle K. Lee  
*Director of the United States Patent and Trademark Office*